Patented Oct. 22, 1946

2,409,840

UNITED STATES PATENT OFFICE 2,409,840

CONTROL SYSTEM

Willard A. Derr and Maurice E. Reagan, Wilkinsburg, Pa., assignors to Westinghouse Electric Corporation, East Pittsburgh, Pa., a corporation of Pennsylvania Application July 7, 1944, Serial No. 543,837

13 Claims. (Cl. 177—353)

Our invention relates, generally, to control systems and it has reference in particular to supervisory systems for supervisory control systems.

Generally stated, it is an object of our invention to provide a supervisory system for detecting faults on supervisory control systems, which is simple and inexpensive to manufacture and is easy to operate.

More specifically, it is an object of our invention to provide for detecting grounds and short or open circuits on a supervisory control channel, as well as grounds on other portions of the system, and low voltage on either the remote or control station battery, and to provide for indicating these conditions at the control station.

It is also an important object of our invention to provide for normally maintaining supervision of a supervisory control channel by means of a relatively small supervision current when the channel is not in use, and for preventing false indications of fault conditions while the channel is being used for pulsing.

Another object of our invention is to provide for detecting and indicating grounds on the supervisory control channel or on the remote station battery, and preventing changes in such indications whenever the channel may be disconnected momentarily from the remote station equipment during a pulsing operation.

Yet another object of our invention is to provide for detecting and indicating grounds on both the remote and control station batteries and to provide for preventing a ground on the control station battery from being indicated by the remote station equipment during a pulsing operation.

Still another object of our invention is to provide for indicating ground conditions on the supervisory control channel or the remote station battery and preventing repeated reporting of the ground condition owing to operations of the line-control relays during pulsing operations.

A further object of our invention is to provide for detecting and indicating low battery voltage conditions upon a relatively small change in the voltage thereof.

Other objects will in part be obvious, and will in part appear hereinafter.

In accordance with our invention, a rectifier device having one terminal grounded is used to operate a ground detection relay whenever the battery or the supervisory control channel, or any of the supervisory control circuits connected to the battery or channel become grounded. Indication of a ground condition at the remote station or on the supervisory control channel is effected by a supervisory relay which is normally controlled by the ground detection relay and effects operation of a supervisory point relay to cause a fault code to be sent over the supervisory system. False operations of the supervisory relay due to operation of the impulse relays which connect the channel to and disconnect it from the remote and control station batteries, are prevented by means of an auxiliary supervisory relay which operates whenever the supervisory control channel is pulsing to remove the supervisory relay from the control of the ground detection relay.

For a more complete understanding of the nature and the scope of our invention, reference may be made to the following detailed description in connection with the accompanying drawings, in which.

Figure 1:
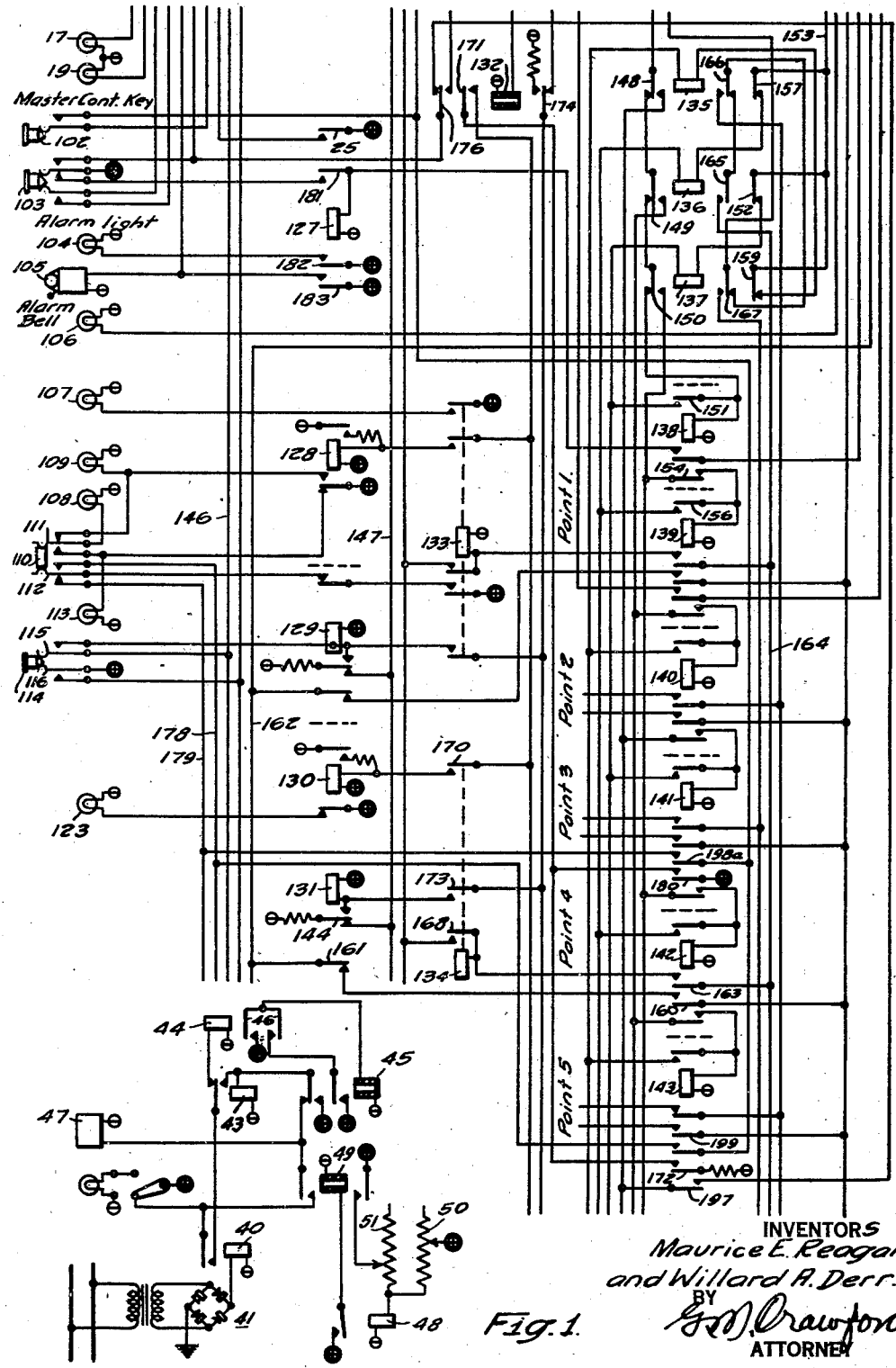
Figure 1 is a diagrammatic view of the individual equipment and selecting relays at the control station.

The above-described figures are disposed to be arranged in a similar manner to Figs. 1 through 4 of the Boswau Patent No. 2,091,301, which issued on August 31, 1937. When thus arranged they represent a supervisory control system which is basically the same as the system described in detail in the Boswau Patent. For the purpose of simplification, some of the circuit conductors have been rearranged from the positions shown in the Boswau Patent, but the general arrangement of the supervisory control equipment and the manner of operation thereof remains substantially the same. Most of the elements of the system of the Boswau patent are shown in the drawings of the present application in the same cooperative relation as in the Boswau patent, and they bear the same reference characters as in the drawing of the Boswau Patent. Certain relays of the Boswau Patent have been modified slightly and other relays have been added in order to perform functions different from those of the apparatus of the Boswau Patent. Entirely new elements have been designed by reference characters not found in the Boswau Patent, whereas other elements which have been changed only slightly have been designated by means of prime numbers corresponding to the designation in the Boswau Patent in order to more readily identify them.

Figure 2:
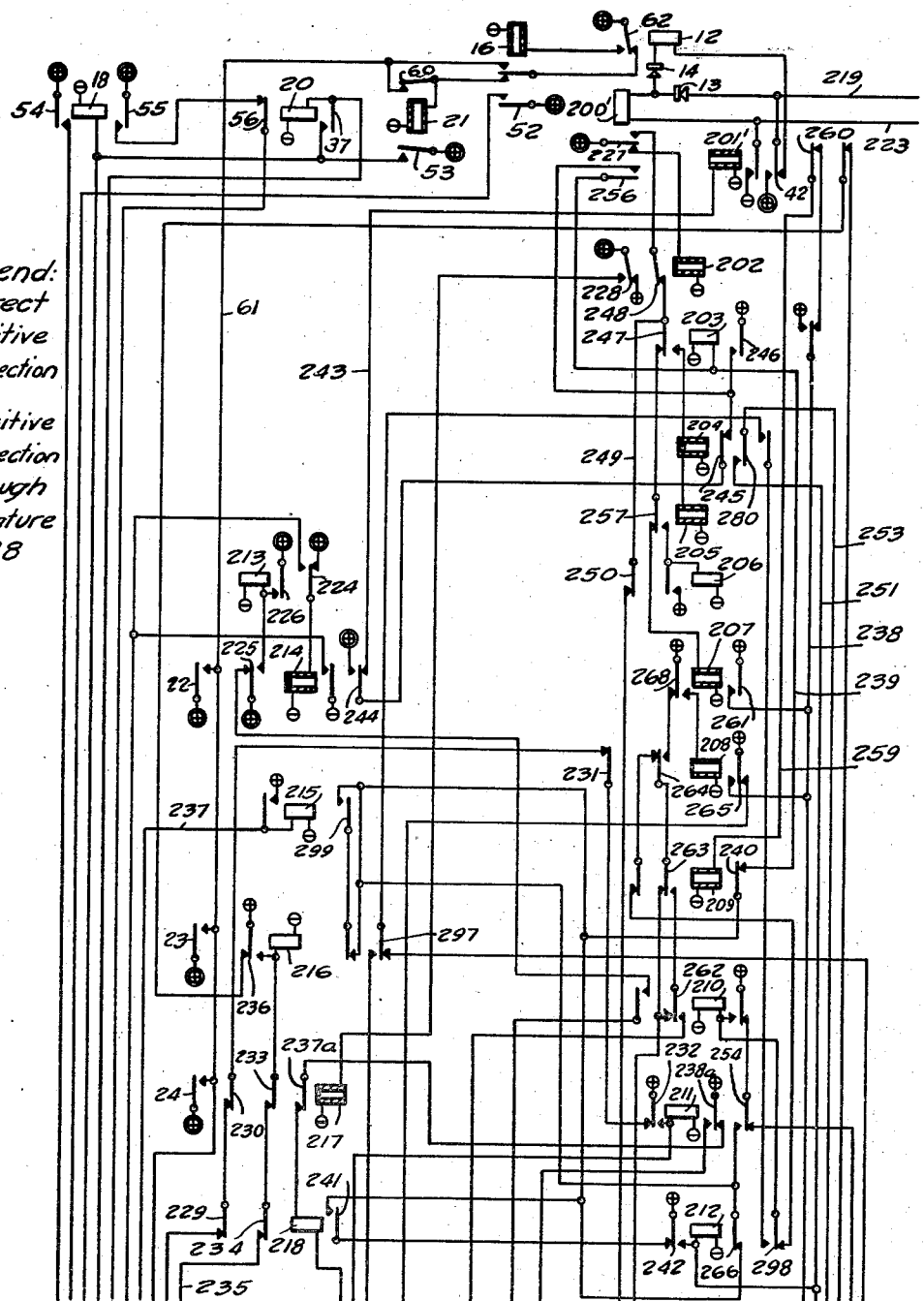
Fig. 2 is a diagrammatic view of the common equipment at the control station.
Figure 4:
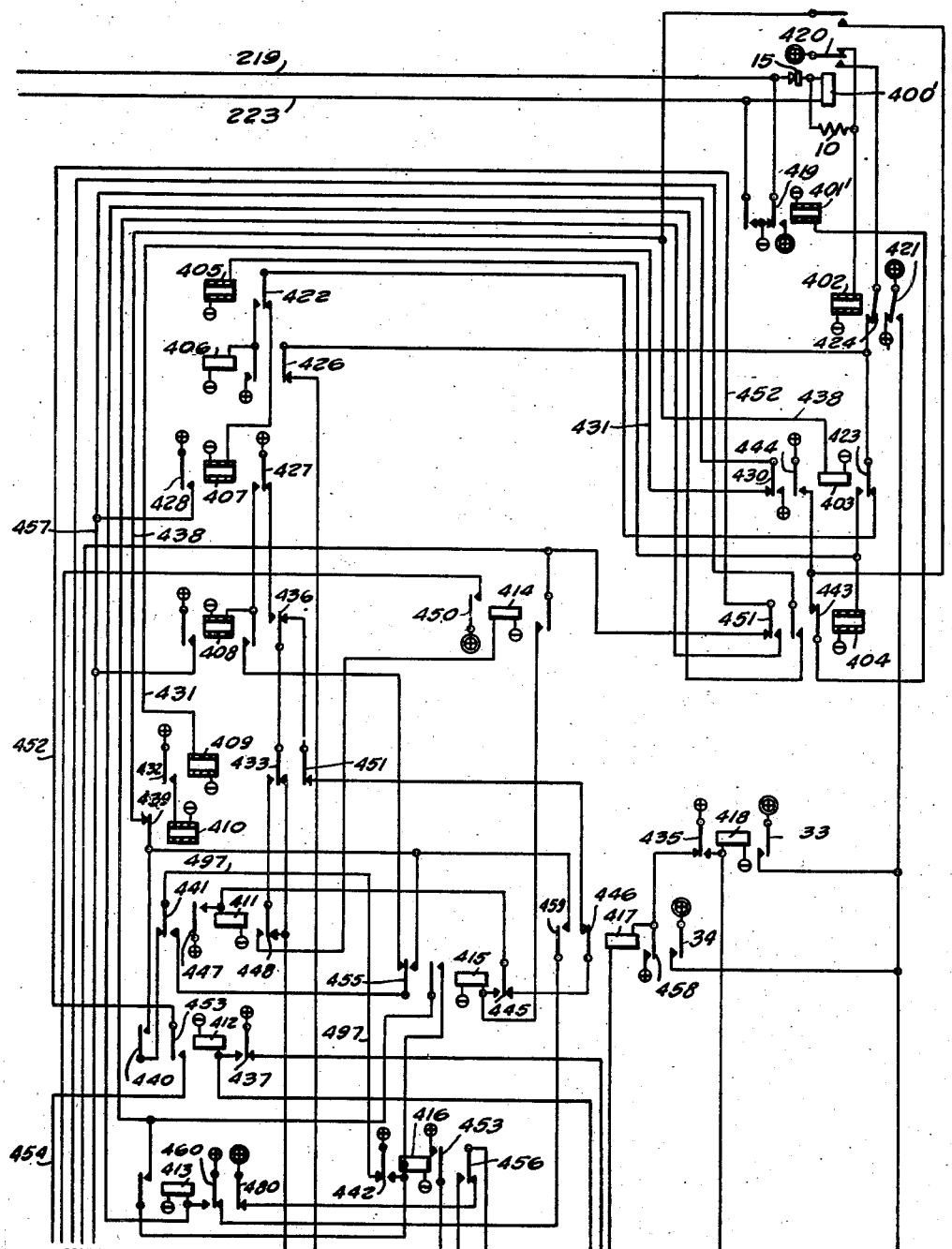
Fig. 4 is a diagrammatic view of the common equipment at the remote station.

Referring particularly to Figs. 2 and 4 of the drawings, it will be seen that the line circuit or supervisory control channel connections have been changed from the series impulsing circuit of the Boswau patent to provide instead a parallel line impulsing circuit which is the type of circuit now most generally used since it provides a continuous circuit which may be used for remote metering, etc. In other words, instead of connecting the operating coils of the line relays 200 and 400 of the control and remote stations by means of a supervisory control channel comprising the conductors 219 and 223 in series circuit relation with contact members of the impulse relays 201 and 401, respectively, as in the Boswau patent, the line relays 200′ and 400′ are herein shown connected in parallel circuit relation. The line relays 200′ and 400′ are normally deenergized, and may be energized by operation of the impulse relays 201′ and 401′ which connect the supervisory control conductors 219 and 223 to the positive and negative terminals of the control and remote station batteries, respectively. Control of the impulse relays 201′ and 401′ may be effected in exactly the same manner as described in detail in the Boswau patent for the impulse relays 201 and 401.

In order to maintain supervision of the supervisory control channel, means may be provided for normally applying a line supervision potential to the control channel conductors, having a polarity opposite to that normally used during pulsing operations. For example, as shown in Fig. 4, auxiliary means such as the control resistor 10, which may be of a relatively high ohmic value so as to normally prevent operation of the line relays, may be provided for connecting the conductor 223 to the positive terminal of the remote station battery through armature 420 and back contacts, and the operating coil of the line relay 400′, while the conductor 219 may be connected to the negative terminal through armature 419 of the impulse relay 401′ and a back contact thereof to the negative terminal of the remote station battery. Means such as the line supervision relay 12 shown in Fig. 2 may be provided at the control station end of the supervisory control channel and disposed to be normally energized by the supervision potential when the supervisory control channel is at rest and in a normal condition. Unidirectional current devices 13, 14 and 15 may be provided in connection with the line supervision relay and the control channel for making the line supervision relay responsive only to the line supervision current.

A control relay 16 may be provided for operating under the control of the line supervision relay 12 in the event it becomes deenergized to light a pilot lamp 19 at the control station as shown in Fig. 1, which indicates to the dispatcher that the equipment is not normal. Means such as the supervisory or alarm relay 18 may be provided for normally operating in response to operation of the line supervision relay 12 to control the operation of an alarm 105 and a line supervision lamp 17 also shown in Fig. 1. A reset relay 20 may be provided for operating under the control of the release key 103 and interrupting the operating circuit of the alarm bell.

In order to prevent false indications due to momentary deenergization of the line supervision relay 12 when the impulse relay 401′ at the remote station is energized or when the impulse relay 201′ at the control station is energized, means such as the auxiliary supervisory relay 21 may be provided which may be normally energized and releasable upon operation of the line supervision relay 12. Circuit means may be provided in connection with armatures 22, 23, 24 and 25 of the restoration start relay 214, selection coding start relay 216, relay 217, and a supervisory alarm relay 127 of the control station equipment, respectively, to provide holding circuits for the auxiliary supervisory relay 21, which may be interposed between the control relay 16 and the alarm relay 18 to prevent energization or deenergization of the alarm relay due to operation of the impulse relays. Relays 16 and 21 may be of the time delay type so as to insure the completion of the auxiliary holding circuits should the line supervision relay 12 become deenergized due to operation of the impulse relays.

Figure 3:
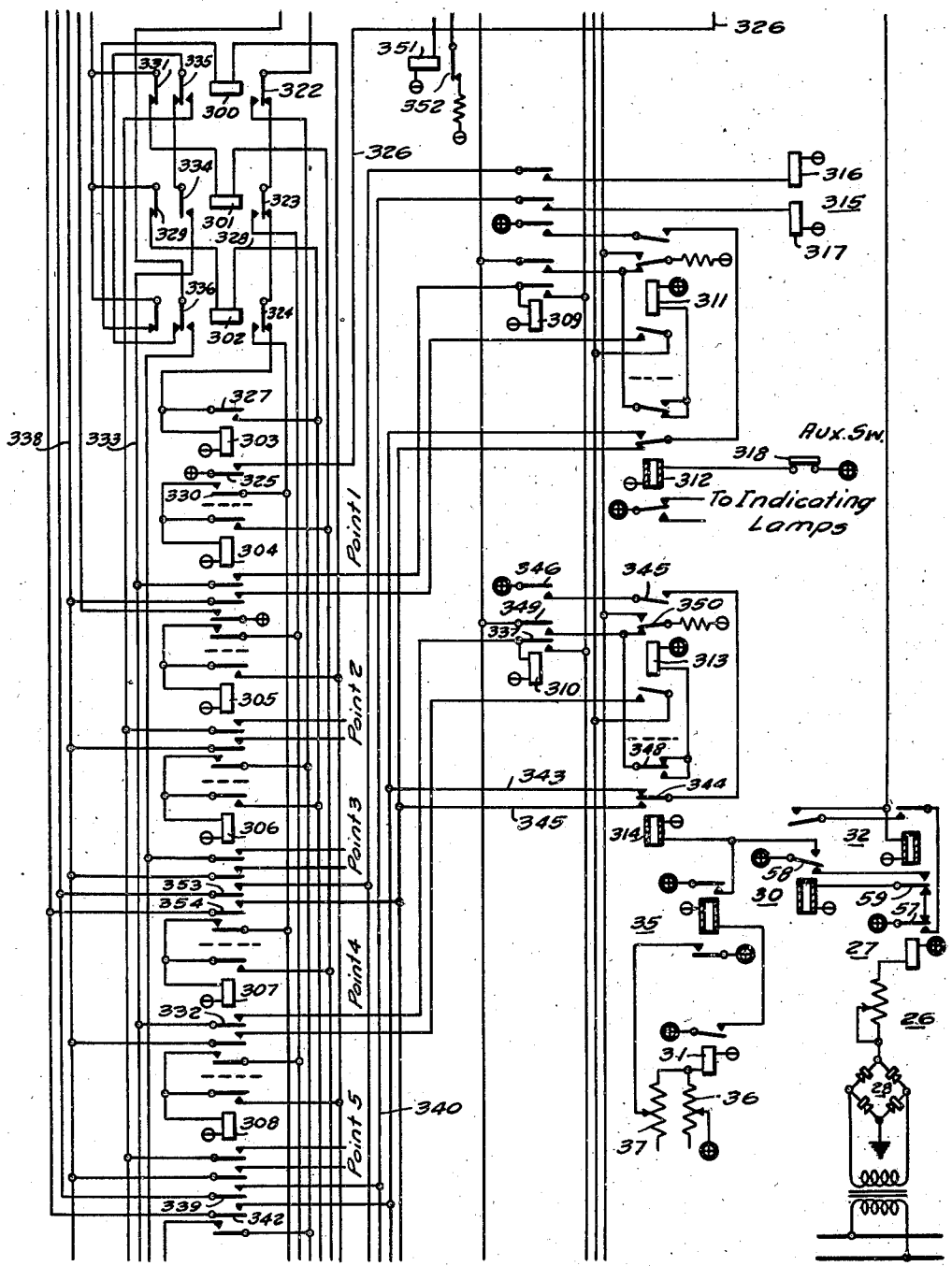
Fig. 3 is a diagrammatic view of the individual equipment and selecting relays at the remote station.

Supervision of the supervisory control channel and the remote station equipment to detect and indicate grounds may be provided by means of ground detection apparatus shown in Fig. 3 and denoted generally by the numeral 26. For example, a ground relay 27 may be provided in conjunction with a suitable source of control potential, such as the rectifier bridge circuit 28, for connection between the positive terminal of the remote station battery and ground. Means such as the supervisory relay 30 may be provided for normally operating under the control of the ground detection relay 27 for energizing the point relay 314, which may operate in connection with point 4 of the supervisory control system.

Since operation of the impulse relays 201′ and 401′ connects the supervisory control channel to and disconnects it from the control station and remote station batteries, false indications of ground conditions might result therefrom. For example, in the case of a ground on the control channel itself, operation of the impulse relay 401′ periodically disconnects the ground from the remote station equipment, causing periodical deenergization of the ground detection relay 27. On the other hand, in the case of a ground on the control station battery or equipment, operation of the impulse relay 201′ periodically connects the ground to the remote station equipment thus causing periodic operation of the ground detection relay 27.

For the purpose of preventing such false indications, means such as the auxiliary supervisory relay 32 may be provided. The auxiliary relay 32 may be interposed between the ground detection relay 27 and the supervisory relay 30 and provided with energizing circuits in connection with armature 421 and back contacts and armatures 33, 34 and front contacts of the remote station release relay 402, relay 418 and the remote station start relay 417, respectively. Relay 30 may be normally energized through back contacts of relay 32 and front contacts of relay 27. An auxiliary circuit may be provided through front contacts of relay 32.

Accordingly, if the supervisory control channel is pulsing, the auxiliary supervisory relay 32 operates to prevent the release of the control of the supervisory relay 30 and thus prevents the point relay 313 from being energized to transmit the ground signal code. Relays 30 and 32 may be of the slow release type so as to insure providing for proper operation.

Indication of low battery voltage at the remote station may be provided by means of a voltage responsive relay 31 which controls a supervisory relay 35 to effect operation of the point relay 314. By normally energizing the voltage relay 31 through a control resistor 36 of one value and providing a reenergizing circuit through an auxiliary control resistor of a different value when the voltage relay drops due to reduced voltage, the relay may be made to pick up when the battery voltage increases only a relatively slight amount. The voltage relay may thus be made to indicate very slight variations in the battery voltage in order to report accurately the condition of the battery.

Grounds on the control station equipment may be indicated by means of a ground relay 40 in conjunction with suitable source of direct-current potential such as the rectifier bridge circuit 41 which may be connected between ground and the negative terminal of the control station battery. In order to provide for preventing the ground detection relay 40 from indicating a ground on the remote station equipment when impulsing is being done from the control station, control relays 43 and 44 may be provided in conjunction with a supervisory relay 45. The control relay 44 may be of the pendulum time delay type having a vibrating armature 46 which periodically engages front contacts for a predetermined time after it is deenergized so that when the ground detection relay 40 operates and completes a circuit for the control relay 44, the relay 44 in turn provides a circuit for energizing the supervisory relay 45 for a predetermined time. The relay 45, in turn, provides an energizing circuit for relay 43 which remains in the energized position for a relatively long time interval or from two to approximately eight seconds, depending upon the adjustment of the time delay relay 44, and prevents operation of an alarm 47. The time interval is sufficiently long that an alarm is prevented from being given, due to any condition which may occur during impulsing, since the time interval required for impulsing is much shorter than the time delay period of the relay 44.

Low battery voltage at the control station may be indicated by means of a voltage relay 48 and an auxiliary relay 49, in conjunction with a control resistor 50 and an auxiliary control resistor 51 in a similar manner to that described in connection with the voltage relay 34 at the remote station.

Under normal conditions with the system at rest, the line supervision relay 12 is energized from the remote station battery through a circuit which may be traced from direct positive through armature 420 of the line relay 400' and back contact, control resistor 10, operating coil of the line relay 400', conductor 223, operating coil of line relay 200', rectifier device 14, operating coil of line supervision relay 12, back contact and armature 42 of impulse relay 201', conductor 219, armature 419 and back contact of impulse relay 401'.

Should either of the impulse relays operate such as during a pulsing operation, the line supervision relay 12 will be momentarily deenergized. Operation of the impulse relays 201' and 401' momentarily drops the line supervision relay, causing the control relay 16 to pick up. The auxiliary supervisory relay 21 is not dropped however, since an auxiliary holding circuit therefor is provided from negative through the operating coil of relay 21, armature 60 and front contacts, conductor 61, and through armature 23 of selection start relay 216 if the pulsing was started from the control station; through armature 25 of the alarm relay 127 if the pulsing originated at the remote station; and through either armature 24 of relay 217 or armature 22 of the restoration start relay 214 if the system is through regular pulsing and in the reset stage.

Should a short circuit or an open circuit occur on the supervisory control channel, the line supervision relay 12 will be deenergized and an obvious energizing circuit will be provided for the control relay 16 through armature 62 and back contact of the line supervision relay 12. At the same time the relay 12 interrupts the energizing circuit for the auxiliary supervisory relay 21. Relay 16 operates to energize the pilot lamp 19 through armature 52 and front contacts. An energizing circuit is provided for the alarm relay 18 through the back contacts and armature 53 of supervisory control relay 21. The relay 18 operates and provides an energizing circuit for the supervision lamp 17 through armature 54, and an energizing circuit for the alarm bell 105 through its armature 55 and armature 56 of the reset relay 20.

By operating the release key 103, an energizing circuit is provided for the reset relay 20 which locks in through its armature 37 and front contact, in multiple with the alarm relay 18 through the armature 53 of the supervisory control relay 21. The alarm bell circuit is interrupted by armature 56 of the reset relay.

Should a ground occur on either the supervisory control channel or the remote station equipment while the system is at rest, the ground detection relay 27 picks up, interrupting the normal energizing circuit for the supervisory control relay 30 at armature 57 and back contacts. Relay 30 drops after a time interval and provides an energizing circuit for the point control relay 314 through armature 58 and back contacts. The supervisory control system then operates in the usual manner to send out four control impulses and select point 4 relay at the control station. The selection is checked in the usual manner and relay 130 operates so that lamp 123 lights to indicate a ground on the remote station equipment or on the supervisory control channel.

Should the impulse relay 401' operate while a ground exists on the supervisory control channel, the ground detection relay 27 would be momentarily released owing to the disconnection of the remote station from the channel. The supervisory relay 30 is prevented from periodically picking up and releasing the point relay 314 to indicate removal of the fault, by providing for interrupting the energizing circuit of the supervisory relay 30 through armature 59 and back contacts of the auxiliary supervisory relay 32. The auxiliary supervisory relay 32 is energized each time the channel pulses through the armatures of one or another of the relays 402, 417 and 418. Accordingly, the energizing circuit of the supervisory relay 30 will be broken by the auxiliary supervisory relay 32 each time the channel is disconnected from the remote station equipment, thus preventing the supervisory relay 30 from picking up and giving a false indication.

In the event that a ground occurs on the control station battery or equipment, a false indication thereof by the remote station is likewise prevented whenever the impulse relay 201' connects the supervisory control channel to the control station equipment. The auxiliary supervisory relay 32 is energized through one or another of the armatures, 34 of the substation start relay 417, 33 of the relay 418 or 421 of the release relay 402, depending on whether the pulsing originates at the remote station, the control station, or whether it is in the reset stage at the end of a pulsing operation. A holding circuit is thereby provided for the supervisory relay 30 through armature 59 and front contacts of relay 32, and armature 58 and front contacts of relay 30 which remains in the energizing position for a predetermined time even though its energizing circuit was momentarily interrupted by armature 59 moving from the back contacts to the front contacts.

In the case that a ground occurs during a pulsing operation, the release of supervisory relay 30 does not take place until the auxiliary supervisory relay 32 releases after the impulsing is over. When relay 30 once releases, it cannot be picked up again until both relays 32 and 27 are released. Relay 32 seals in through front contacts of ground detection relay 27, its own front contacts, and a back contact of supervisory relay 30. Relay 32 is thus prevented from releasing due to the release of relay 27 during pulsing. The supervisory relay 30 is, therefore, prevented from being energized again until ground detection relay 27 drops out for a long enough time to indicate that the ground no longer exists. Repeated reporting of the ground is thus prevented, and the visual indication at the control station is held until the ground is removed.

From the above description and the accompanying drawings, it will be apparent that we have provided, in a simple and effective manner, for providing complete supervision of the station equipment and supervisory channel against grounds, and have provided for accurately indicating the relative location of such ground. In addition, provision has been made for maintaining continuous supervision of the supervisory control channel against short or open circuits without any interference by reason of impulsing operations over the channel. Separate indications are also provided of low battery conditions at the remote and control stations.

Since certain changes may be made in the construction of the above-described apparatus and different embodiments of the invention may be made without departing from the spirit and scope thereof, it is intended that all the matter contained in the above description and shown in the accompanying drawings shall be considered as illustrative and not in a limiting sense.

We claim as our invention:

1. In a supervisory control system having remote and control stations with a single supervisory and control channel extending therebetween and supervisory and control equipment at each station including normally deenergized supervisory control relays for controlling the energization of the supervisory and control channel, control means responsive to a faulty condition of the channel or an associated circuit, circuit means including a back contact of a normally deenergized supervisor control relay normally connecting the channel to a source at the remote station, means responsive to operation of the control means for indicating the faulty condition at the control station, and means responsive to energization and deenergization of the supervisory and control channel for preventing false indications due to operation of the supervisory control relays.

2. A ground detection system for a supervisory control system having supervision and control apparatus including an impulse relay and a station battery at each of remote and control stations operable over a single supervisory and control channel therebetween comprising, means at one of the stations including a ground relay and a source of operating potential connected between ground and one terminal of the battery at said station to be responsive to a ground fault condition on the supervisory control equipment at said one station and the channel and associated circuits, supervisory means controlled by said means operable to indicate the fault condition at the control station, and circuit means including relay means controlled in accordance with operations of the impulse relays from either of the stations to prevent operation of the impulse relays from affecting the fault-responsive means when a ground fault occurs on the channel.

3. For use in a supervisory control system having supervisory and control equipment including a line relay at each of a remote and a control station operably connected in parallel circuit relation by a single supervisory control line disposed to be selectively connected to sources of the same polarity at each of the stations by impulsing relays, means responsive to a fault condition of the line or equipment including a supervision relay at the control station and unidirectional current means at the control and remote stations connected to provide a series circuit with the line relays over the control line only for a supervision potential of an opposite polarity, supervisory means normally responsive to operation of the fault-responsive means, and means including control means operable in accordance with the operating condition of the supervisory control line to prevent connection of the line to and disconnection thereof from the supervisory and control equipment during operation of the line relays from affecting operation of the supervisory means.

4. For use with a supervisory control system having supervisory control equipment at remote and control stations controllable over a supervisory control channel which is normally connected to a source at one of the stations by impulse relays, means including a rectifier bridge circuit connected between ground and the positive terminal of the source to which the channel is normally connected and a ground relay responsive to a ground condition on the supervisory control channel or the equipment associated with said one source, supervisory means normally responsive to operation of the ground responsive means to provide indication of a ground on said equipment or the channel, and circuit means including control means responsive to predetermined operations of the supervisory control equipment for preventing changes in the connections between the supervisory control channel and the said equipment from affecting the operation of the supervisory means when a ground occurs on the channel.

5. For use in a supervisory control system having remote and control stations connected by a supervisory control channel connecting line relays at the stations in parallel relation and controlled by supervisory control equipment including normally deenergized supervisory control relays at each station, means for normally applying a supervisory potential to the supervisory control channel at a remote station through contacts of a normally deenergized supervisory control relay, and means at the control station connected to the channel by a normally deenergized supervisory control relay to be controlled by said potential for operation in response to a fault condition on the channel.

6. For use in supervising the supervisory and control channel connecting supervisory control equipment including normally deenergized line relays at remote and control stations, means normally connecting the channel to a source at the remote station for supplying a supervision potential to the channel without operating the line relays when the system is at rest which is opposite in polarity to the operating potential of the channel, supervisory means operable in response to the supervision potential to indicate an open circuit or short circuit on the channel, supervision means including a ground relay connected between the source and ground operable to indicate a ground on the remote station equipment or channel, and means effective to prevent operation of the supervisory control equipment from affecting operation of the ground relay to indicate a faulty channel condition while the channel is operating.

7. In a supervision system for a supervisory control system having a supervisory control channel connecting the equipment at remote and control stations disposed to be energized with a predetermined polarity during operation by impulse relays at the remote and control stations, channel supervision means, unidirectional current means connected between the channel supervision means and the channel for preventing operation thereof only on a polarity opposite to the operating polarity, means associated with the remote station for applying a supervision potential to the channel opposite in polarity to the operating potential of the channel when the channel is not in operation, auxiliary means under the control of the channel supervision means for indicating a loss of supervision potential at the control station, and means including relay means operable when the channel is operating to prevent the auxiliary means from indicating a loss of potential when the channel is operating.

8. In a supervision system for a supervisory and control channel connecting supervisory and control equipment at remote and control stations including supervisory control relays at the control station operable under different conditions of channel operation and impulse relays at the remote and control stations operable to connect the channel to a source of one polarity, a line supervision relay, circuit means including a unidirectional current device connecting the line supervision relay to the supervisory control channel, means associated with the remote station line control relay for applying a supervision potential to the channel when the channel is not in operation for operating the line supervision relay, indicating means normally responsive to operation of the line supervision relay to the inoperative position to indicate a faulty channel condition, and control means controlling operation of the indicating means, said control means being responsive to operation of one of the supervisory control relays to prevent operation of the indicating means during operation of the supervisory control channel.

9. In a supervision system for a supervisory control channel connecting supervisory control equipment at remote and control stations including impulse relays operable to energize the channel with a predetermined polarity and a plurality of supervisory control relays operable to effect operation of the impulse relays in selecting, checking operating and supervisory operations, means associated with the remote station impulse relay for energizing the channel with an opposite polarity when the channel is not in operation, supervisory means including a relay associated with the channel and operable only in response to said opposite polarity, a time delay relay operable in response to release of the supervisory means, a normally energized auxiliary time delay relay controlled by said time delay relay, signal means normally operable when the auxiliary time delay relay releases, and circuit means associated with one of the supervisory control relays for providing a holding circuit for the auxiliary time delay relay when the impulse relay operates.

10. A ground detection system for a supervisory control system having supervisory control equipment with separate sources at remote and control stations connected by a single supervisory control channel under the control of impulse relays at each of the stations comprising, ground detection means connected to the source of the remote station operable in response to a ground condition, supervisory means normally controlled by the ground detection means for providing an indication at the control station of a ground condition, and means associated with the supervisory means for preventing the ground detection means from effecting operation of the supervisory means in response to a ground condition at the other station while the channel operatively connects the equipment at both stations.

11. A ground detection system for a supervisory control system having supervisory control equipment at remote and control stations with a plurality of points and a supervisory control channel connecting normally deenergized line relays controlled by impulse relays for connecting the channel to control sources at each station for predetermined intervals during operation comprising circuit means connecting the channel to the source at the remote station when the impulse relays are deenergized, a ground detection relay, circuit means including a rectifier device for providing a unidirectional ground detection potential connecting the ground detection relay between the remote station source and ground, time delay supervisory means operable under the control of the ground detection relay to send a fault code signal from a predetermined point, and an auxiliary time delay relay operable during connection of the channel to the control sources to prevent any change in the condition of the supervisory means.

12. In a supervisory system for a supervisory control system having supervisory control equipment including line relays at remote and control stations with sources of control voltage at each station and a supervisory control channel extending between the stations connecting the line relays in parallel relation and disposed to be connected to the sources by impulse relays for providing one polarity while operating and the opposite when not operating, a point relay at the remote station operable to provide a predetermined signal code for indicating at the control station, means including a separate source and a ground relay responsive to a ground condition on the channel or at the remote station for normally effecting operation of the point relay to signal said condition, normally energized relay means operable after a time delay to the deenergized position to effect operation of the point relay, normally-deenergized relay means responsive to operation of the ground relay normally operable to effect operation of the normally energized relay means, and control means operable in accordance with the operating condition of the channel for effecting energization of the normally deenergized relay means while the channel is operating to transmit a code signal.

13. In a supervisory system for a supervisory control system having supervisory control equipment with associated sources of control voltage at remote and control stations and a supervisory control channel extending therebetween disposed to be connected to said sources by impulse relays under the control of said equipment, means at the remote station responsive to a ground condition, supervisory means normally responsive to operation of the ground responsive means for effecting operation of the remote station impulse relay to signal a fault condition, control means at the remote station operable in accordance with the operating condition of the channel to prevent operation of the line relays from affecting the operating condition of the supervisory means, line supervision means including a line supervision relay connected to the channel by the control station line-control relay in the inoperative condition, means associated with the remote station impulse relay for applying a supervision potential to the channel when said impulse relay is in the inoperative position for effecting operation of the line supervision relay, supervisory means at the control station operable under the control of the line supervision relay for indicating a short or open circuit condition of the channel, and control means operable in accordance with the operating condition of the channel for preventing operation of the impulse relays from affecting the operating position of the supervisory means.

WILLARD A. DERR.
MAURICE E. REAGAN.